United States Patent

Kaneda et al.

[11] Patent Number: 5,434,736
[45] Date of Patent: Jul. 18, 1995

[54] TAPE CASSETTE WITH REDUCED SHRINKAGE MARK

[75] Inventors: Hiroshi Kaneda; Yuji Ishikawa, both of Tokyo, Japan

[73] Assignee: TDK Corporation, Tokyo, Japan

[21] Appl. No.: 71,622

[22] Filed: Jun. 3, 1993

[30] Foreign Application Priority Data

Jun. 9, 1992 [JP] Japan .................................. 4-173683

[51] Int. Cl.⁶ ............................................. G11B 23/02
[52] U.S. Cl. .................................................. 360/132
[58] Field of Search ................ 360/132; 242/197–201, 242/347

[56] References Cited

U.S. PATENT DOCUMENTS 5,189,583  2/1993  Okamura .............................. 360/132

Primary Examiner—A. J. Heinz
Attorney, Agent, or Firm—Seidel Gonda Lavorgna & Monaco

[57] ABSTRACT

Shrinkage mark due to difference in thickness between a thick bottom portion and a thin bottom wall portion of a cassette is reduced by forming a recess in the thick wall portion and life of molding dies is elongated by forming an end wall of the recess having a top surface in common with the parting line of the thick bottom wall portion.

3 Claims, 5 Drawing Sheets

F I G. 1
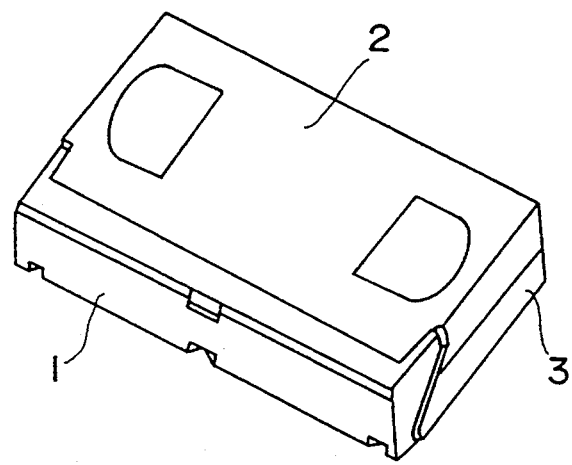
F I G. 2
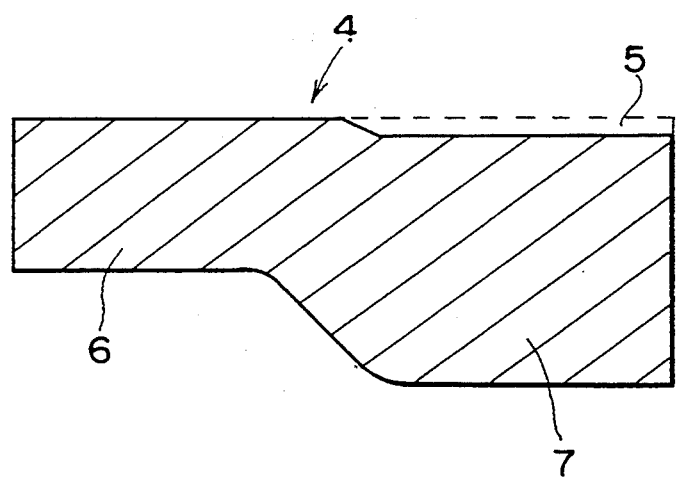

F I G. 4
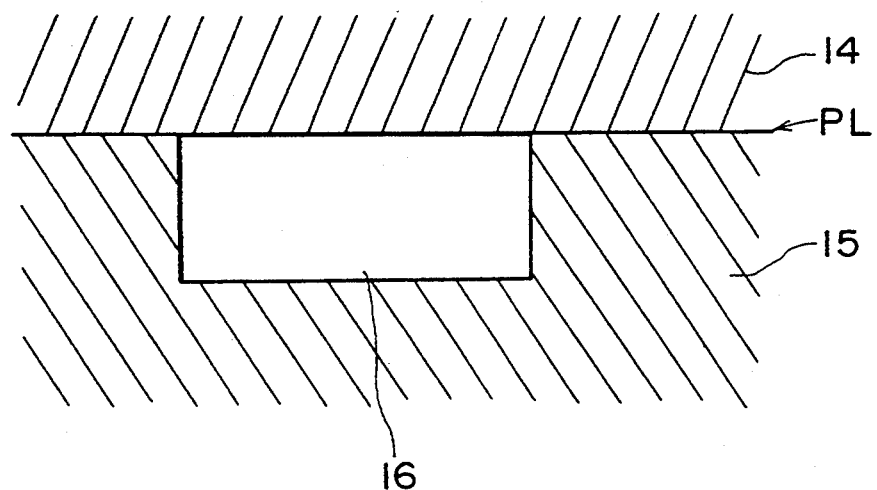
F I G. 5
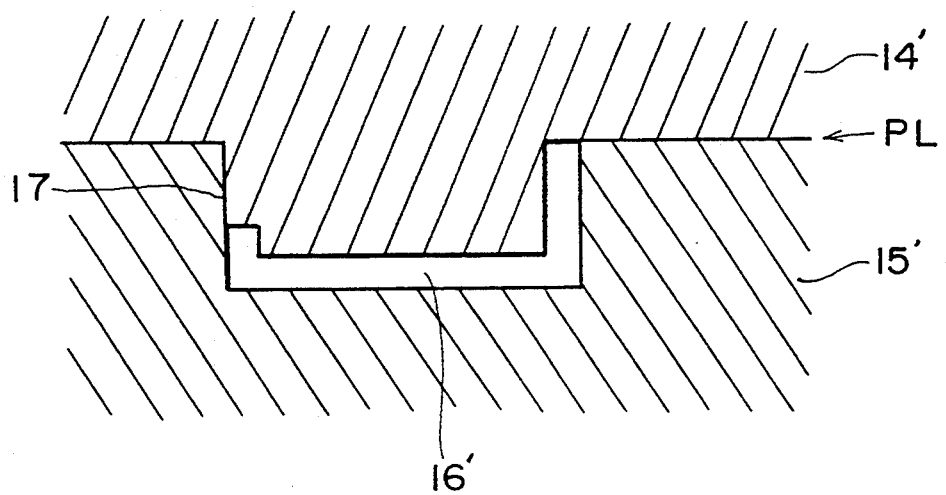

F I G. 6
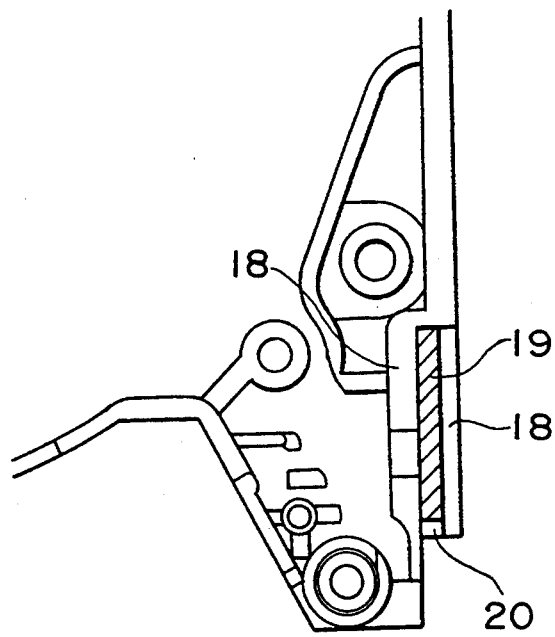
F I G. 7
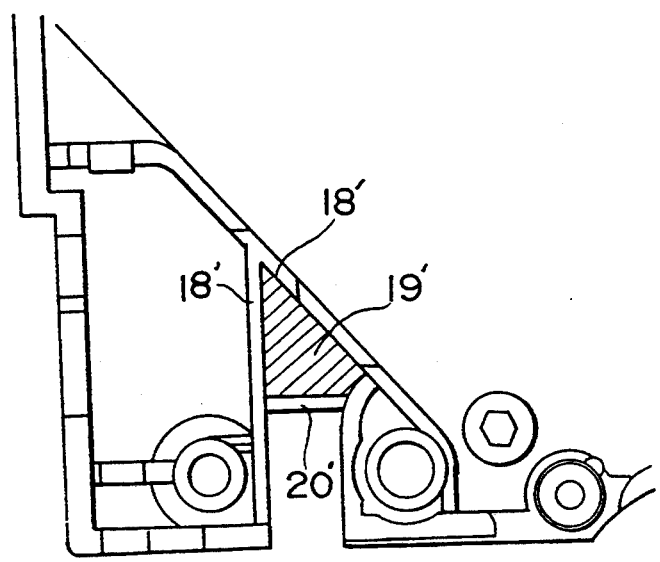

5,434,736

TAPE CASSETTE WITH REDUCED SHRINKAGE MARK

BACKGROUND OF THE INVENTION

1. Field of the Invention

The present invention relates to a tape cassette including an upper half and a lower half and, more particularly, a tape cassette having a partially reduced wall thickness without changing parting line (PL) of molds to be used.

2. Prior Art and Problem to be Solved

As shown in FIG. 1, the conventional tape cassette is composed of a housing including an upper half 2, a lower half 3 and a guard panel 1 as main components. Trials have been made in production of this type of tape cassette to reduce the weight of the tape cassette by reducing the thickness of a major bottom wall portion of the lower half 3, which leads to reduction in the time required for its molding operation as well as reduction of the manufacturing cost.

However, this type of cassette had an inherent drawback. This will be explained in reference to FIG. 2. First of all, solidification of a plastic material used for molding such cassette will be explained. FIG. 2 illustrates a cross section 4 of a molded article having a thinner wall portion 6 and thicker wall portion 7 having a transition area between them. It is well known in the art that, when cooled after injection molding of a plastic material, the thinner wall portion 6 is solidified faster than the thicker wall portion 7. During the course of solidification, the thinner wall portion 6 draws a portion of unsolidified plastic material from the adjacent thicker wall portion 7, with the result that surface layer 5 of the wall portion 7 is recessed as shown in FIG. 2, to form an unsightly shrinkage mark. Thus, the difference in the solidification time gives rise to shrinkage mark.

With a tape cassette having a lower half 3 having a thin major wall portion 10 in the form of an eye mask and thick wall portions in the other portions such as those indicated at A and B in FIG. 3(a), shrinkage marks 12 and 13 are necessarily formed as shown in FIG. 3(c) on the outer surface of the lower half in the areas as shown corresponding to a groove 8 and a triangular portions 11 of FIG. 3(a).

In order to solve this shrinkage mark problem, the applicant tried to simply make the portion groove 8 and triangular portion 9 thinner than normal and this measure was proved effective. However, although the problem of shrinkage mark is solved, a new problem arises due to the fact that the parting line PL of molds for these portions 8 and 9 does not conform to that for the thick portions in the areas A and B and thus the lateral surfaces of the molds are engaged with each other to rub off the engaged areas of the lateral surfaces, thereby causing the problem of reducing the life of the molds. More specifically, mating faces of the molds 14 and 15, which define a cavity 16 for forming a bottom wall of the groove 8 or the triangular portion 9, conforms to the parting line PL prior to the modification as shown in FIG. 4. On the other hand, mating faces of the modified molds 14' and 15', which define a cavity 16' for forming a bottom wall of the groove 8 or the triangular portion 9, include a projection different from the parting line PL for reducing the thickness of the bottom wall and thus the molds 14' and 15' include sliding contact portions 17 on their lateral surfaces as shown in FIG. 5, resulting in attrition or scraping of the contact portions 17.

DETAILED EXPLANATION OF THE INVENTION

Object of the Invention

Accordingly, a principal object of the present invention is to eliminate shrinkage mark of a tape cassette which is formed during solidification of the injection molding when the thickness of a wall portion of the cassette is reduced.

Another object of the present invention is to solve the new problem of attrition when the conventional tape cassette is modified to eliminate the shrinkage mark.

Abstract of the invention

These object and other objects are achieved by a tape cassette including a plastic housing or case comprising an upper half and a lower half and the lower half including a generally thin major bottom wall portion and a generally thick front bottom wall portion, wherein the front thick bottom wall portion is provided with a wall portion having a reduced wall thickness area without changing the parting line PL.

The invention will be explained in detail by making reference to the attached drawings.

Brief Explanation of the Drawings

FIG. 1 is a perspective view of a tape cassette;

FIG. 2 is a cross section of a molded plastic article having wall portions of different wall thickness, showing a shrinkage mark;

FIG. 4 is a cross section of molds having a common parting ling PL;

FIG. 5 is a cross section of molds having different parting line heights;

FIG. 6 is an enlarged plane view of a portion of the cassette according to the present invention corresponding to A of FIG. 3(a);

FIG. 7 is an enlarged plane view of another portion of the cassette of the present invention corresponding to B of FIG. 3 (b)

Preferred Embodiments of the Invention

Figure 3A:
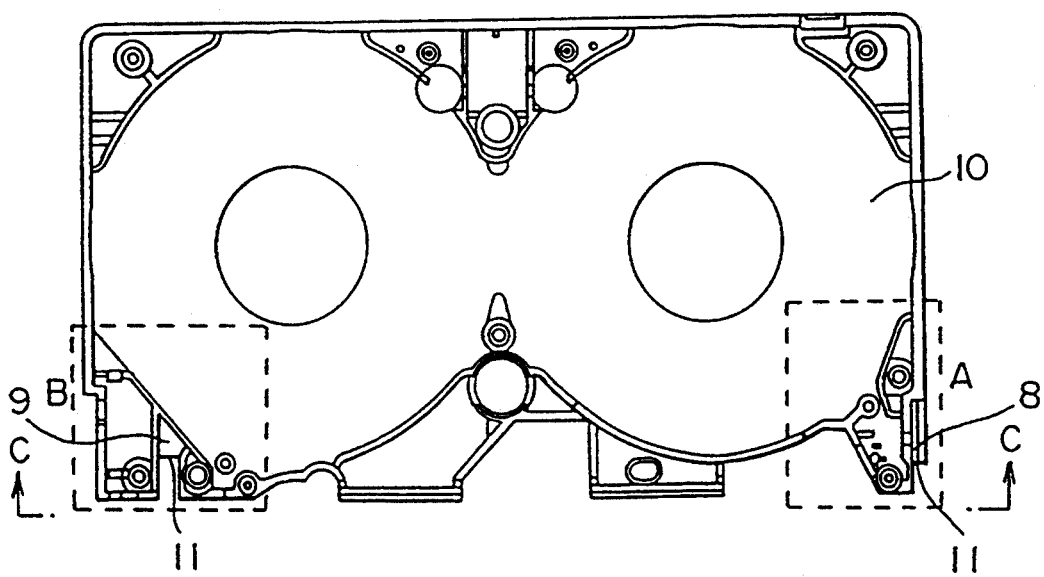
FIG. 3 is a lower half of the conventional tape cassette and (a) is a plane view, (b) is front view and (c) is a bottom view.

A tape cassette according to the present invention is similar to the conventional tape cassette except for portions corresponding to the portions A and B of FIG. 3(a). Thus, the tape cassette according to the present invention includes a plastic housing or case comprising an upper half and a lower half and the lower half comprising a major bottom wall having a thin wall thickness area in the shape of an eye mask, corresponding to the thin wall thickness area 10 of the conventional tape cassette shown in FIG. 3(a). This portion has a lower parting line PL than that of the front portion of the tape cassette. The lower half further includes a generally thick front portion which has a higher parting line PL than the thin thickness portion.

Figure 3B:
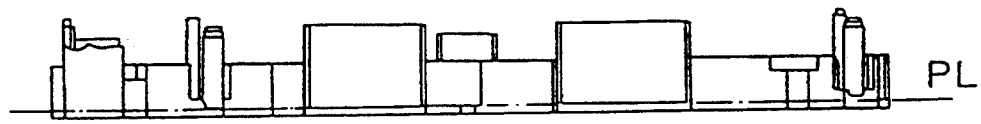
Figure 3C:
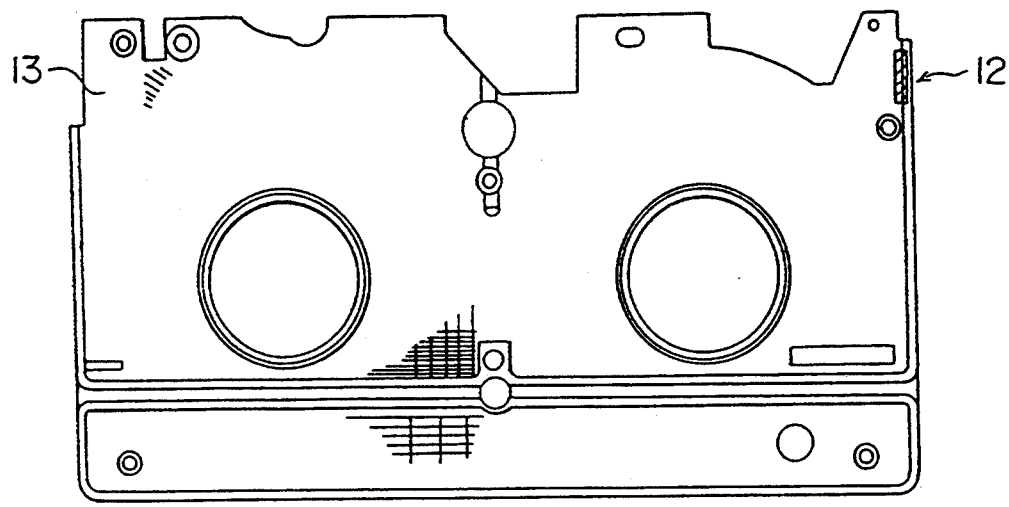

FIG. 6 and FIG. 7 illustrate embodiments of a tape cassette according to the present invention which correspond, respectively, to A and B of FIG. 3.

In FIG. 6, the lower half of the tape cassette comprises a generally thick portion and a groove 19 having a bottom wall of a reduced wall thickness surrounded by an upright walls 18 and an upright front wall portion 20. This front wall portion 20 lies in the same plane as high as the parting line PL of molds to be used for molding the tape cassette. Formation of shrinkage mark is prevented owing to the presence of the thin bottom wall of the groove 19. Comparison of this embodiment with the above-mentioned modified design in FIG. 5 shows that the present invention is different from the modified design in that a front wall 20 having a height as high as the parting line PL is added to the front end of the groove 9 of the modified design. Comparison with the conventional tape cassette in FIG. 3(a) shows that the present invention is different from the conventional cassette in that a groove 19 deep enough to remove shrinkage mark is formed in the conventional thick wall portion while leaving a front wall 20 having a height as high as the parting line PL as it is.

The triangle portion 19' is similarly constructed, which comprises a triangular recess having a thin bottom wall thin enough to suppress shrinkage mark, a front end wall 20' as high as the parting line and surrounding walls 18'.

Figure 8:
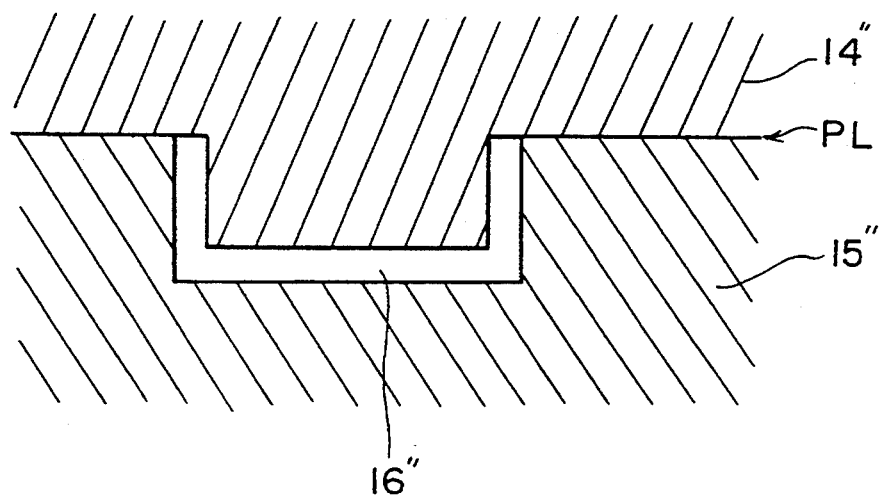
FIG. 8 is an explanatory cross sectional view of the portion of the cassette taken along portions corresponding to A and B of FIG. 3 in which the parting line is on the same height.

Molds for injection-molding the cassette according to the present embodiments are schematically shown in FIG. 8, wherein a cavity includes a reduced thickness 16" forming the bottom wall of the groove 19 and a front portion 17" forming the front end wall 20. It is noted that the molds 14" and 15" do not have any sliding contact portion.

Effects Resulting from the Invention

From the foregoing, it is evident that the present invention not only eliminates the problem of shrinkage mark formation in a tape cassette which is formed during solidification of the injection molding when the thickness of a wall portion of the cassette is reduced, but also the problem of attrition when the conventional tape cassette is modified to eliminate the shrinkage mark, due to the difference in the parting lines of the molds. Thus, the cassette is made thin and light and reduction in the molding time, thereby reducing the cost of the tape cassette.

Although a few preferred embodiments have been described, it should be understood that a number of modifications may be conceived for those skilled in the art without departing from the spirit of the present invention.

We claim:

1. A tape cassette including an upper half and a lower half to form a tape housing therein and said lower half including a generally thin major bottom wall portion and a generally thick front bottom wall portion having a generally flat top surface conforming to the height of a parting line formed by molding, characterized in that said thick front bottom wall portion is provided with a recess in said top surface for reducing shrinkage mark, and said recess including at a front end thereof an end wall having a top surface substantially in common with a parting line of said thick bottom wall portion.

2. A tape cassette according to claim 1 wherein the recess is in the shape of a groove.

3. A tape cassette according to claim 1 wherein the recess is in the shape of a triangle.

* * * * *